United States Patent
Sanders

(10) Patent No.: US 12,072,265 B2
(45) Date of Patent: Aug. 27, 2024

(54) LEAK DETECTION METHOD AND APPARATUS

(71) Applicant: Stress Engineering Services, Inc., Houston, TX (US)

(72) Inventor: Matthew Sanders, Cypress, TX (US)

(73) Assignee: Stress Engineering Services, Inc., Houston, TX (US)

( * ) Notice: Subject to any disclaimer, the term of this patent is extended or adjusted under 35 U.S.C. 154(b) by 278 days.

(21) Appl. No.: 17/510,308

(22) Filed: Oct. 25, 2021

(65) Prior Publication Data

US 2022/0128426 A1    Apr. 28, 2022

Related U.S. Application Data

(60) Provisional application No. 63/104,943, filed on Oct. 23, 2020.

(51) Int. Cl.
*G01M 3/10* (2006.01)
*G01M 3/38* (2006.01)

(52) U.S. Cl.
CPC ............... *G01M 3/10* (2013.01); *G01M 3/38* (2013.01)

(58) Field of Classification Search
CPC ............. G01M 3/10; G01M 3/38; G01M 3/32
See application file for complete search history.

(56) References Cited

FOREIGN PATENT DOCUMENTS

| CN | 109269587 A | * | 1/2019 | ............ G01F 17/00 |
| JP | 2013002929 A | * | 1/2013 | |

OTHER PUBLICATIONS

English Machine Translation of Sato et al., JP-2013002929-A, 2013, Translated Online Dec. 2023 (Year: 2013).*
English Machine Translation of Zhang et al., CN-109269587-A, 2019, Translated Online Dec. 2023 (Year: 2019).*

* cited by examiner

*Primary Examiner* — David Z Huang

(57) ABSTRACT

A method and apparatus for measuring gas leakage in a graduated cylinder where water is displaced by the gas in a graduated cylinder in combination with a balance scale, allowing for both a visual indication of the gas detected and a change in weight measurement on the scale, correlating to a certain volume of gas detected.

13 Claims, 2 Drawing Sheets

LEAK DETECTION METHOD AND APPARATUS

RELATED APPLICATIONS

This application claims priority to U.S. Provisional Application No. 63/104,943, filed Oct. 23, 2020.

BACKGROUND OF THE INVENTION

Leak detection measurement has to be accurate, easy to measure, and verifiable. Past efforts to measure leak detection include motion detection using a bubble detector. The problems with motion detection is that it is not accurate. It can only tell if a bubble went by, but cannot accurately quantify the size of the bubble. It cannot be used on non-gaseous or liquid only detection systems. Another type of leak detection method involves resistive films, but it is not accurate enough for testing. Another method is using a pressure transducer. The issue with pressure transducers is that it is expensive to get a pressure transducer with the required sensitivity to measure small leaks. It is also difficult to obtain repeatable results with a pressure transducer. Cameras have been used for leak detection. However, cameras require a costly setup, there are issues with viewing straight on the water line, and the data fidelity is too high, resulting in too much raw data versus the actual data desired. Other leak detection options may include ultrasonic sensors, however these sensors are costly, integrating the sensors into systems poses challenges, and there are many complex unknowns with ultrasonics. There is also radio frequency sensors, these sensors are costly, integrating the sensors into systems poses challenges, and there are many complex unknowns with these types of sensors.

SUMMARY OF EXAMPLE EMBODIMENTS

An example embodiment may include a testing apparatus comprising a scale, a container located on the scale, a graduated cylinder having a column of liquid with a sealed top portion and an open bottom portion, suspended above the scale having the bottom portion disposed within a liquid in the container, a leak detection input tube entering the liquid in the container and terminating inside the bottom portion of the graduated cylinder, wherein any gas from the input tube is trapped in the top portion of the graduated cylinder.

A variation of the example embodiment may include the gas being simultaneously measured visually and electronically. The gas measured may verify the integrity of a gas seal. The volume of gas trapped may be measured by the volume of the column of liquid in the graduated cylinder that is displaced. The volume of gas trapped may be measured by the change in weight of the liquid in the container. The gas may be leaked gas from a pressurized tubular. The gas may be leaked gas from a pipe joint. The gas may be leaked gas from a threaded connection between two tubulars.

An example embodiment may include a testing system comprising a leak boot adapted to seal off a portion of a tubular and having a leak detection line out tube for conveying leaked gases, a scale, a container located on the scale, a graduated cylinder having a column of liquid with a sealed top portion and an open bottom portion, suspended above the scale having the bottom portion disposed within a liquid in the container, and the leak detection line out tube entering the liquid in the container and terminating inside the bottom portion of the graduated cylinder, wherein any gas from the input tube is trapped in the top portion of the graduated cylinder.

A variation of the example embodiment may include the portion of the tubular being a pipe joint. The portion of the tubular may be a threaded connection between two tubulars. The tubular may be internally pressurized with a gas. The leaked gas may be simultaneously measured visually and electronically.

An example embodiment may include a method for leak testing comprising sealing off a portion of a tubular, pressurizing an internal volume of the tubular, capturing leaked gas escaping from the tubular, visually measuring the volume of leaked gases visually, and electronically measuring the volume of the leaked gases electronically, wherein the visual measuring and electronic measuring occur simultaneously.

An example embodiment may include the portion of the tubular being a joint. The portion of the tubular may be a threaded connection between two tubulars. It may include counting the bubbles produced by the leaked gases in a volume. It may include verifying the integrity of the portion of a tubular. It may include determining the volume of gas leaked by the volume of fluid displaced. It may include determining the volume of has leaked by the change in weight of a volume of fluid displaced.

BRIEF DESCRIPTION OF THE DRAWINGS

For a thorough understanding of the present invention, reference is made to the following detailed description of the preferred embodiments, taken in conjunction with the accompanying drawings in which reference numbers designate like or similar elements throughout the several figures of the drawing. Briefly.

DETAILED DESCRIPTION OF EXAMPLES OF THE INVENTION

In the following description, certain terms have been used for brevity, clarity, and examples. No unnecessary limitations are to be implied therefrom and such terms are used for descriptive purposes only and are intended to be broadly construed. The different apparatus, systems and method steps described herein may be used alone or in combination with other apparatus, systems and method steps. It is to be expected that various equivalents, alternatives, and modifications are possible within the scope of the appended claims.

Figure 1:
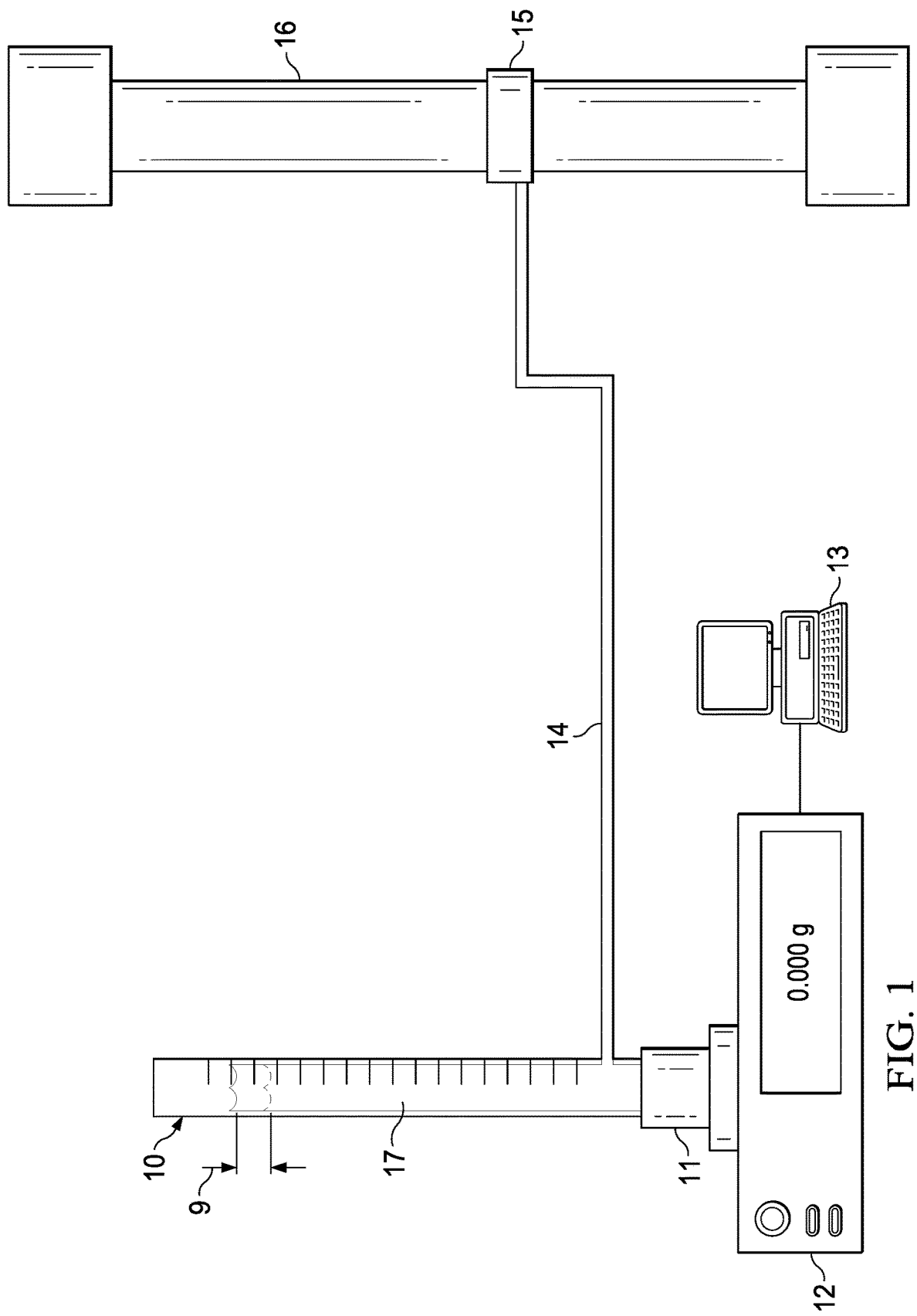
FIG. 1 shows an example embodiment of a liquid measurement setup.

An example embodiment disclosed in FIG. 1 includes a graduated burette or graduated cylinder 10 containing a fluid 17. The graduated cylinder 10 is held in a base 11. The graduated cylinder 10, fluid 17, and base 11 are located on a laboratory balance scale 12. The scale is measuring the weight electronically and sending its data to a data acquisition system 13, in this example, a computer. A test article 16, in this example, a pressurized pressure vessel, includes a leak detection boot 15. The leak detection boot 15 is used to trap pressure leakage from the test article 16 and communicate it to the graduated cylinder 10 and scale 12 via tubing 14. The change in volume 9 is both measured visually and its change in weight, which corresponds to a volume of leaked fluid, is measured by scale 12.

Figure 2:
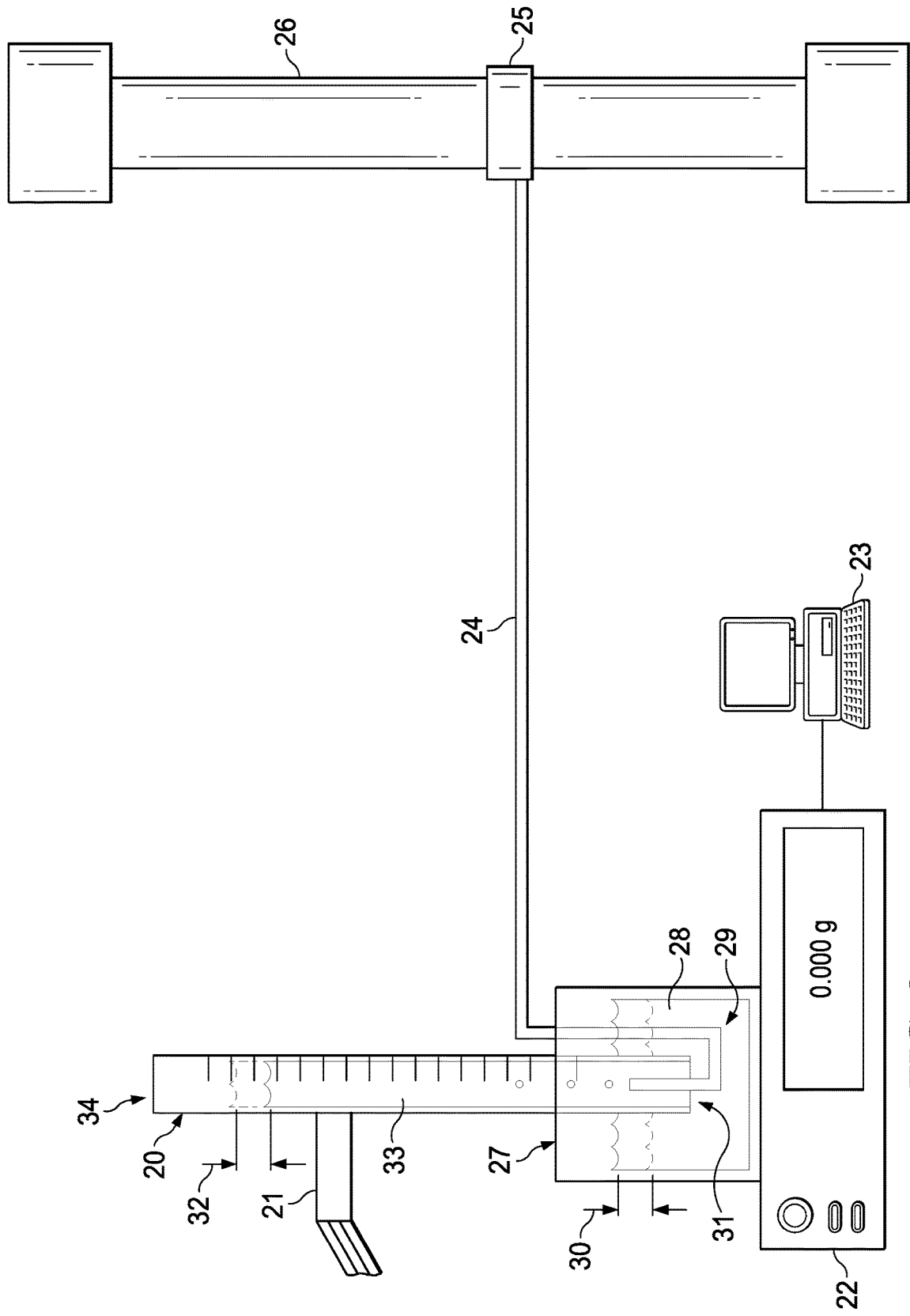
FIG. 2 shows an example embodiment of a gas measurement setup.

An example embodiment disclosed in FIG. 2 includes a graduated burette or graduated cylinder 20 containing within the cylinder a fluid 33. The graduated cylinder 20 is held in place by holder 21. The graduated cylinder 20 has an open bottom 31 suspended within container 27. Container 27 contains a fluid 28. The container 27 and the fluid 28 in the container 27 are located on a laboratory scale 22. The scale 22 is measuring the weight electronically and sending its data to a data acquisition system 23, in this example, a computer.

A test article 26, in this example, a pressurized pressure vessel, includes a leak detection boot 25. The leak detection boot 25 is used to trap pressure gas leakage from the test article 26 and communicate it to the graduated cylinder 20 and scale 22 via tubing 24. The tubing 24 connecting the leaked fluid from the leak detection boot 25 is routed via the pipe U-turn 29 through the container 27, into the container fluid 28 and under and into the bottom 31 of graduated cylinder 20.

As gas leaks into the boot 25, it travels through the tubing 24 and into the graduated cylinder 20. Graduated cylinder 20 is sealed at the top 34. As the gas leaks, it collects at the top 34, displacing the fluid 33 downwards. The volume of the gas collected creates a volume displacement change that is equal to the volume displacement increase of water seen by the scale 12. The change in volume 32 is both measured visually and its change in weight, which corresponds to a volume of leaked gas, is measured by scale 22.

An example embodiment may include a method for leak testing comprising sealing off a portion of a tubular 26, pressurizing an internal volume of the tubular 26, capturing leaked gas escaping from the tubular using a leak detection boot 25, visually measuring the volume of leaked gases visually via change in volume 32, and electronically measuring the volume of the leaked gases electronically via scale 22, wherein the visual measuring and electronic measuring occur simultaneously.

An example embodiment may include the portion of the tubular 26 being a joint. The portion of the tubular 26 may be a threaded connection between two tubulars. It may include counting the bubbles produced by the leaked gases in a volume. It may include verifying the integrity of the portion of a tubular 26. It may include determining the volume of gas leaked by the volume of fluid displaced. It may include determining the volume of has leaked by the change in weight of a volume of fluid displaced.

A change in volume can be visually measured using a graduated cylinder while simultaneously the same change can be weighed. This allows for two independent measurements of the same change to be conducted simultaneously, each with their own advantages. One that is visual and one that can be easily digitally recorded. The visual method uses a graduated cylinder that is easily intuitive but is difficult to digitally record. The other weight based method is not as easily intuitive because it requires a correlated weight to volume through a verification, but it can be easily recorded. This allows for the advantages of both methods to be used on a single volume change giving an intuitive visual method that is also easily recorded. The method and apparatus can be used on a volume change of both gas or liquid fluids. One application of this method and apparatus is to measure the amount of leakage while conducting testing on pressure containing articles.

Objectives of the disclosed embodiment include recording and storing data electronically, retains accuracy of current methods for detecting leaks, compatibility with traditional leak detection methods, complies with the relevant standards (API 5C5 & ISO 13679), is defendable for research and validation purposes, and has a demonstrable accuracy.

Although the invention has been described in terms of embodiments which are set forth in detail, it should be understood that this is by illustration only and that the invention is not necessarily limited thereto. Top and bottom could be left and right, respectively. The alternative embodiments and operating techniques will become apparent to those of ordinary skill in the art in view of the present disclosure. Accordingly, modifications of the invention are contemplated which may be made without departing from the spirit of the claimed invention.

What is claimed is:

1. A testing apparatus comprising:
   a scale;
   a container located on the scale;
   a graduated cylinder having a column of liquid with a sealed top portion and an open bottom portion, suspended above the scale having the bottom portion disposed within a liquid in the container; and
   a leak detection input tube entering the liquid in the container and terminating inside the bottom portion of the graduated cylinder, wherein any gas from the input tube is trapped in the top portion of the graduated cylinder.

2. The testing apparatus of claim 1, wherein the gas is simultaneously measured visually and electronically.

3. The testing apparatus of claim 1, wherein the gas measured verifies the integrity of a gas seal.

4. The testing apparatus of claim 1, wherein the volume of gas trapped is measured by the volume of the column of liquid in the graduated cylinder that is displaced.

5. The testing apparatus of claim 1, wherein the volume of gas trapped is measured by the change in weight of the liquid in the container.

6. The testing apparatus of claim 1, wherein the gas is leaked gas from a pressurized tubular.

7. The testing apparatus of claim 1, wherein the gas is leaked gas from a pipe joint.

8. The testing apparatus of claim 1, wherein the gas is leaked gas from a threaded connection between two tubulars.

9. A testing system comprising:
   a leak boot adapted to seal off a portion of a tubular and having a leak detection line out tube for conveying leaked gases;
   a scale;
   a container located on the scale;
   a graduated cylinder having a column of liquid with a sealed top portion and an open bottom portion, suspended above the scale having the bottom portion disposed within a liquid in the container; and
   the leak detection line out tube entering the liquid in the container and terminating inside the bottom portion of the graduated cylinder, wherein any gas from the input tube is trapped in the top portion of the graduated cylinder.

10. The testing system of claim 9, wherein the portion of the tubular is a pipe joint.

11. The testing system of claim 9, wherein the portion of the tubular is a threaded connection between two tubulars.

12. The testing system of claim 9, wherein the tubular is internally pressurized with a gas.

13. The testing system of claim 9, wherein the leaked gas is simultaneously measured visually and electronically.

\* \* \* \* \*